June 3, 1930.　　　W. E. ISACKSON　　　1,761,345
AUTO LIGHT
Filed March 21, 1929
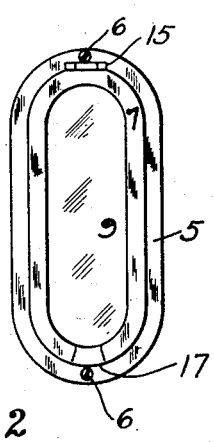
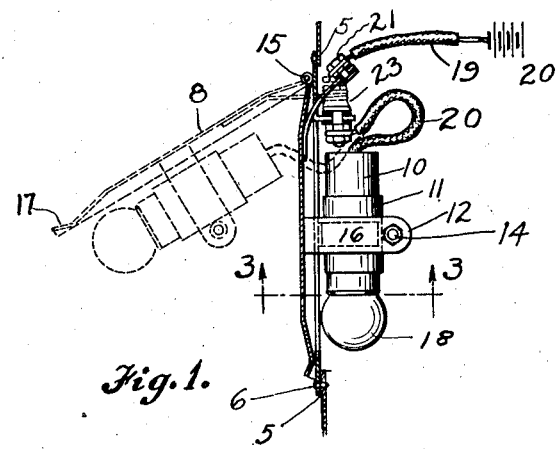
Fig. 2　　Fig. 1.
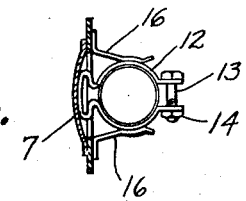
Fig. 3.
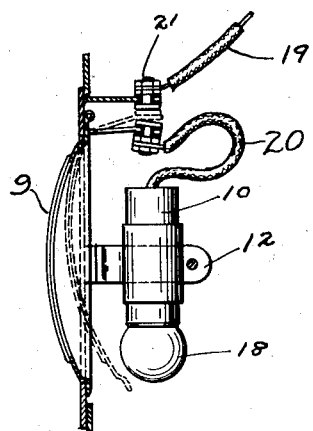
Fig 5　　Fig. 4.
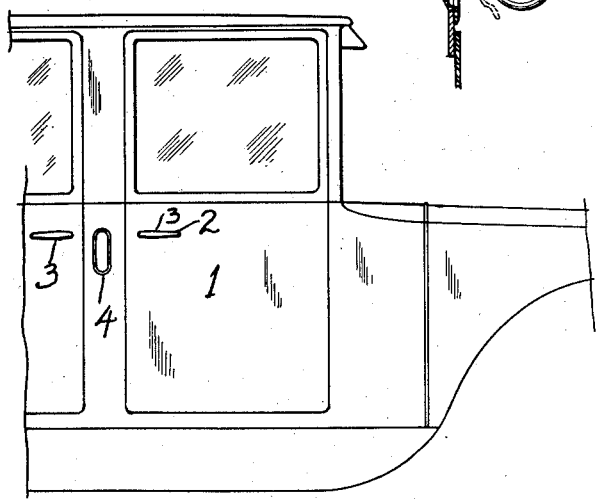
INVENTOR
Walter E. Isackson
BY
ATTORNEY Patented June 3, 1930

1,761,345

UNITED STATES PATENT OFFICE

WALTER E. ISACKSON, OF RENTON, WASHINGTON

AUTO LIGHT

Application filed March 21, 1929. Serial No. 348,957.

This invention relates to improvements in auto lights and more particularly such lights as are convenient for use upon automobile bodies to illuminate the key hole of the auto door. For example, closed automobiles usually are provided with locks for the doors. It is often difficult to locate the key hole to unlock the door, necessitating tedious delay in case the operator of the car has not provided himself with a flashlight of some kind.

The principal object of this invention is to provide a light affixed to the body of a machine and adjacent to the key hole, of such construction as to make it possible for the operator of the car to readily locate the switch even in the dark and to operate it so as to illuminate the key hole.

A further object is to provide a light which ordinarily will protrude slightly beyond the surface of the body of the car and which may be swung to a position to illuminate the key hole which may be located either in the door handle or the door frame.

A still further object is to provide a switch which will be operated with the displacement of the light.

The invention is illustrated in the accompanying drawings, in which:

Figure 1 is a side elevation of my device showing a fragment of the auto body to which the device is applied.

Figure 2 is a front elevation of the device.

Figure 3 is a sectional view taken upon the line 3—3 of Figure 1.

Figure 4 is an alternative form of the device.

Figure 5 is a side elevation of an automobile with parts broken away, with my device applied thereto.

An automobile door 1, having the usual handle 2, has the key hole 3 located in the handle. The invention is indicated broadly at 4 and consists in a frame 5 secured to the automobile body by means of screws 6. A door 7 is bulged outwardly, as at 8, and hingedly mounted on the frame 5. Glass or other transparent material 9 may be set in the door in one of the forms presently to be described, and may be omitted if the other form be used.

A cylinder 10 of insulating material is thrust through a sleeve 11 which in turn is secured to the frame 5 by means of straps 12 which have their ends secured together by a bolt 13 and nuts 14, the straps 12 thus binding the sleeve 11 and being secured to the door 7 by soldering or other convenient means. The door is hinged at 15 to the frame 5. Extending inwardly from the frame 5 are a pair of spring arms 16 which engage the straps 12 so as to hold the door in a closed position.

The bottom of the door is somewhat outturned, as at 17, so as to form a ledge for the finger or thumb nail, when it is desired to swing the door from its full lined position, as seen in Figure 1, to its dotted line position. A light bulb 18 is carried by the cylinder 10. A conducting wire 19 leads from the usual battery 20 and has a terminal 21. A second conducting wire 22 leads from the lamp to a terminal 23 so that when the lamp is in its normal position the terminals 23 and 21 are out of contact with each other and the lamp, of course, dark, but when the lamp is swung into its dotted line position, the terminals contact with each other and cause the light to glow.

Now, assuming that the door 1 is locked and it is not sufficiently light for one to see the key hole, the operator simply moves his hand along over the door and the side of the car until his hand contacts with the bulged portion 8 which, of course, is out of the plane of the car and the door. This will guide the operator instantly so that he can project his thumb beneath the out-turned portion 17 of the door and swing the door from its full lined position to its dotted line position in Figure 1, which of course will cause the light to glow and illuminate the key hole fully. If the door 7 were flat or approximately within the plane of the surface of the automobile door, this operation would not be so convenient, but as stated, the door 7 has been bulged out so that it is easy to locate by passing the hand around in the locality of the door.

In the alternative form shown in Figure 4, the door 7 has a transparent inset 9 and the door 7, instead of swinging outwardly about its hinge point, swings inwardly to its dotted position, as seen in Figure 4, when it is desired to cause the lamp 18 to glow. In other words, the operation is just the reverse of the operation just described. The reason for this is that one does not have to pass his hand over the surface of the door 1 in order to locate the door 7, but by merely leaning his body against that side of the car the bulged portion 8 will be caused to move into its dotted line position, as seen in Figure 4, thereby causing the lamp to glow and the rays of which will pass out through the transparent inset 9, there being sufficient spring in the conducting wire 20 to cause the door to swing from its dotted line position to its full line position, as seen in Figure 4. In other words, in order to illuminate the locality of the key hole, all that is necessary is for the operator to lean his body against the car, unlock the door 1, when the door 7 will automatically close and the parts will be in their normal positions.

A light of this type would not only be of use in illuminating the key hole but also furnishing light for persons getting in or out where there are no street lights. Such a device would have constant use; even in mending tires or other emergency tinkering, a light illuminating the running board would be of great benefit.

What is claimed to be new is:

A lamp adapted to be mounted in the side of an automobile comprising a narrow substantially oval-shaped frame, means securing said frame to the car body, a plate hingedly secured to the frame, a clamp secured to the inner side of said plate, a bulb supported in said clamp, a contact arm secured to the frame, a second contact carried by the hinged plate, said contacts being brought together to complete a circuit upon swinging of the plate and light the bulb, and spring arms secured to the frame to receive the clamp and thereby hold the door secure, the said plate serving to cast the rays of the light downward and sidewise, and as a closure for the opening in the body of the car.

In testimony whereof I affix my signature.

WALTER E. ISACKSON.